United States Patent [19]

Daeumer et al.

[11] Patent Number: 5,348,993
[45] Date of Patent: Sep. 20, 1994

[54] AQUEOUS POLYMER DISPERSIONS

[75] Inventors: Bernd Daeumer, Deidesheim; Andree Dragon, Speyer; Wilhelm F. Beckerle, Bobenheim-Roxheim; Gernot Franzmann, Bobenheim; Josef Neutzner, Neustadt; Eckehardt Wistuba, Bad Duerkheim; Joachim Pakusch, Ludwigshafen; Maximilian Angel, Mutterstadt, all of Fed. Rep. of Germany

[73] Assignee: BASF Aktiengesellschaft, Ludwigshafen, Fed. Rep. of Germany

[21] Appl. No.: 15,426

[22] Filed: Feb. 9, 1993

[30] Foreign Application Priority Data

Feb. 29, 1992 [DE] Fed. Rep. of Germany ....... 4206429
Aug. 5, 1992 [DE] Fed. Rep. of Germany ....... 4225864

[51] Int. Cl.$^5$ ............................................. C08L 1/26
[52] U.S. Cl. .................................................. 524/44
[58] Field of Search ..................................... 524/44

[56] References Cited

U.S. PATENT DOCUMENTS 4,345,044 8/1982 Columbus et al. .................. 523/220
4,365,040 12/1982 Eck et al. ............................ 524/819

FOREIGN PATENT DOCUMENTS 2827382 1/1979 Fed. Rep. of Germany .
2031313 11/1970 France .
0569257 1/1981 Japan .

Primary Examiner—Melvyn I. Marquis
Assistant Examiner—D. Aylward
Attorney, Agent, or Firm—Oblon, Spivak, McClelland, Maier & Neustadt

[57] ABSTRACT

Aqueous polymer dispersions contain, as a dispersant, a mixture of an ethylene oxide/propylene oxide copolymer, an ethoxylated alkylphenol and/or an ethoxylated fatty alcohol, an ethoxylated polysaccharide and, if required, as a further component, sulfuric acid half-esterified with an ethoxylated alkylphenol and/or an ethoxylated fatty alcohol.

11 Claims, No Drawings

AQUEOUS POLYMER DISPERSIONS

The present invention relates to aqueous polymer dispersions which contain one or more polymers obtainable by free radical polymerization and, based on the one or more polymers, a) from 0.5 to 3% by weight of at least one polyether (dispersant a) composed of ethylene oxide and propylene oxide,
b) from 0.5 to 4% by weight of at least one ethoxylated alkylphenol and/or ethoxylated fatty alcohol (dispersant b),
c) from 0.5 to 3% by weight of at least one ethoxylated polysaccharide (dispersant c) and
d) from 0 to 4% by weight of one or more compounds selected from the group consisting of sulfuric half-esters of ethoxylated alkylphenols and ethoxylated fatty alcohols and water-soluble salts thereof (dispersant d).

The present invention furthermore relates to a process for the preparation of these aqueous polymer dispersions and to their use (in aqueous or spray-dried form) as additives for mineral binders used as building materials.

The use of aqueous polymer dispersions, in which the polymers present can have the most varied monomer composition, as additives for mineral binders used as binding materials is known.

DE-28 27 382 C2 recommends, for example, aqueous polymer dispersions based on aromatic monomers and-/or esters of acrylic acid as additives for mineral binders used as building materials, in particular those based on cement. DE-28 27 382 C2 makes no mention of the dispersants used for stabilizing these aqueous polymer dispersions. Evidently, they are not considered to have any effect on the performance characteristics of said mineral binders modified with these polymer dispersions. However, our own investigations have shown that the dispersant present in the aqueous polymer dispersion influences the performance characteristics of said mineral binders modified with these polymer dispersions, both in the nonsolidified and in the solidified state.

Japanese Preliminary Published Application 9257/81 discloses that a monomer mixture consisting of 60% by weight of vinyl acetate and 40% by weight of VEO-VA ® 9-11 (VEOVA X is a trade mark of Shell and represents vinyl esters (of carboxylic acids which are also referred to as Versatic ® X acids) of the general formula I

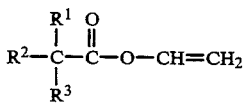

where $R^1$, $R^2$ and $R^3$ are alkyl radicals whose total number of carbon atoms ($R^1 + R^2 + R^3$) is equal to X minus 2), can be polymerized by free radical aqueous emulsion polymerization in the presence of a dispersant and a free radical polymerization initiator, the dispersant used being a mixture of partially hydrolyzed polyvinyl acetate and ethoxylated polypropylene glycol; the aqueous polymer dispersion thus obtainable can be spray dried and the resulting redispersible polymer powder can be used as an additive for mineral binders used as building materials and based on cement. However, the disadvantage of said modified mineral binders is that the mortars produced therefrom do not have completely satisfactory performance characteristics.

It is an object of the present invention to provide aqueous polymer dispersions which are based on polymers obtainable by free radical polymerization and whose dispersant has a particularly advantageous effect, both in the solidified and in the nonsolidified state, on performance characteristics of the hydraulic binders modified with these aqueous polymer dispersions or with redispersible polymer powders thereof obtained by spray drying.

We have found that this object is achieved by the aqueous polymer dispersions defined at the outset.

Suitable building blocks of the polymers obtainable by free radical polymerization among the monomers capable of undergoing free radical polymerization include, in particular, monoethylenically unsaturated monomers, such as olefins, e.g. ethylene, vinyl and vinylidene halides, such as vinyl and vinylidene chloride, vinyl aromatic monomers, such as styrene, α-methylstyrene, o-chlorostyrene or vinyltoluenes, esters of vinyl alcohol and monocarboxylic acids of 1 to 18 carbon atoms, such as vinyl acetate, vinyl propionate, vinyl n-butyrate, vinyl laurate and vinyl stearate, esters of α,β-monoethylenically unsaturated mono- and dicarboxylic acids of, preferably, 3 to 6 carbon atoms, in particular acrylic acid, methacrylic acid, maleic acid, fumaric acid and itaconic acid, with alkanols of, in general, from 1 to 12, preferably 1 to 8, in particular 1 to 4, carbon atoms, in particular methyl, ethyl, n-butyl, isobutyl, tert-butyl and 2-ethylhexyl acrylate and methacrylate, dimethyl maleate and n-butyl maleate, nitriles of α,β-monoethylenically unsaturated carboxylic acids, such as acrylonitrile, and conjugated $C_4$–$C_8$-dienes, such as 1,3-butadiene and isoprene. The stated monomers are as a rule the main monomers, which together usually account for more than 50% by weight, based on the polymer. Monomers which, when polymerized alone, usually give homopolymers which have high water solubility are usually concomitantly polymerized only as modifying monomers in amounts of less than 50, as a rule from 0.5 to 20, preferably from 1 to 10, % by weight, based on the total amount of the monomers of which the polymer is composed.

Examples of such monomers are α,β-monoethylenically unsaturated mono- and dicarboxylic acids of 3 to 6 carbon atoms and amides thereof, for example acrylic acid, methacrylic acid, maleic acid, fumaric acid, itaconic acid, acrylamide and methacrylamide, as well as vinylsulfonic acid and water-soluble salts thereof, and N-vinylpyrrolidone. Monomers which usually increase the internal strength of films of the aqueous polymer dispersion are concomitantly polymerized, as a rule, likewise only in minor amounts, generally from 0.5 to 10% by weight, based on the total amount of the monomers to be polymerized. Such monomers usually have an epoxy, hydroxyl, N-methylol or carbonyl group or at least two nonconjugated ethylenically unsaturated double bonds. Examples of these are N-alkylolamides of α,β-monoethylenically unsaturated carboxylic acids of 3 to 10 carbon atoms and esters thereof with alcohols of 1 to 4 carbon atoms, among which N-methylolacrylamide and N-methylolmethacrylamide are very particularly preferred, monomers having two vinyl radicals, monomers having two vinylidene radicals and monomers having two alkenyl radicals. The diesters of dihydric alcohols with α,β-monoethylenically unsaturated monocarboxylic acids are particularly suitable, among which in turn acrylic and methacrylic acid are preferably used. Examples of such monomers having two non-conjugated ethylenically unsaturated double bonds are alkylene glycol diacrylates and dimethacrylates, such as ethylene glycol diacrylate, 1,3-butylene glycol diacrylate, 1,4-butylene glycol diacrylate and propylene glycol diacrylate, divinylbenzene, vinyl methacrylate, vinyl acrylate, allyl methacrylate, allyl acrylate, diallyl maleate, diallyl phthalate, diallyl fumarate, methylenebisacrylamide, cyclopentadienyl acrylate or triallyl cyanurate. Also of particular importance in this connection are the $C_1$–$C_8$-hydroxyalkyl methacrylates and acrylates, such as hydroxyethyl, hydroxy-n-propyl or hydroxy-n-butyl acrylate and methacrylate, and compounds such as diacetoneacrylamide and acetylacetoxyethyl acrylate or methacrylate. In addition to monomers having unsaturated double bonds, minor amounts, usually from 0.01 to 2% by weight, based on the monomers to be polymerized, of molecular weight regulators, such as tert-dodecyl mercaptan or 3-mercaptopropyltrimethoxysilane, may be concomitantly polymerized. Such substances are preferably added to the polymerization zone as a mixture with the monomers to be polymerized.

Preferred classes of polymers are those which consist of from 50 to 100% by weight of esters of α,β-monoethylenically unsaturated carboxylic acids of 3 to 6 carbon atoms and alkanols of 1 to 12 carbon atoms and/or vinylaromatic monomers or from 50 to 100% by weight of styrene and/or butadiene or from 50 to 100% by weight of esters of vinyl alcohol with alkanecarboxylic acids of 1 to 20 carbon atoms.

The following two classes A and B of polymers are very particularly preferred.

Class A comprises polymers which consist of
a) from 70 to 100% by weight of at least one monomer selected from the group consisting of styrene, α-methylstyrene, vinyltoluenes and esters of α,β-monoethylenically unsaturated carboxylic acids of 3 to 6 carbon atoms and alkanols of 1 to 12 carbon atoms (monomers Aa) and
b) from 0 to 30% by weight of other copolymerizable monomers (monomers Ab).

Class B comprises polymers which consist of
a) from 50 to 80% by weight of at least one ester of vinyl alcohol and straight-chain alkanecarboxylic acids of 1 to 18 carbon atoms (monomers Ba),
b) from 5 to 40% by weight of at least one ester of vinyl alcohol and branched alkanecarboxylic acids of 1 to 20 carbon atoms (monomers Bb),
c) from 0 to 45% by weight of one or more esters of α,β-monoethylenically unsaturated carboxylic acids of 3 to 6 carbon atoms and alkanols of 1 to 18 carbon atoms (monomers Bc) and
d) from 0 to 5% by weight of other copolymerizable monomers (monomers Bd).

Advantageously polymerized monomers Aa are styrene and esters of acrylic and/or methacrylic acid, among which the esters of alkanols of 1 to 8 carbon atoms are preferred. The corresponding esters of acrylic acid are particularly preferred, among which n-butyl acrylate is particularly advantageous.

Suitable monomers Ab are, in particular, monomers which, when polymerized alone, give homopolymers having high water solubility. Examples of these are acrylic and methacrylic acid and amides thereof, vinylsulfonic acid, the water-soluble salts of these acids and the monoesters of acrylic and methacrylic acid with alkanediols of 2 to 6 carbon atoms, in particular those of 1,2-ethanediol, of 1,2- and/or 1,3-propanediol and of 1,4-butanediol, the monoesters of acrylic acid once again being preferred. As a rule, these previously mentioned monomers Ab are polymerized in a total amount of less than 10% by weight, based on the total amount of the polymerized monomers.

Further suitable monomers Ab are esters of vinyl alcohol and straight-chain alkanecarboxylic acids of 1 to 18 carbon atoms, in particular vinyl acetate, vinyl propionate, vinyl n-butyrate and vinyl laurate. Examples of other suitable monomers Ab are alkenes of not more than 5 carbon atoms and polyunsaturated hydrocarbons, such as butadiene.

The polymer A particularly advantageously has the following composition:
from 10 to 70% by weight of n-butyl acrylate,
from 30 to 90% by weight of styrene and
from 0 to 10% by weight of monomers Ab,
the esters of acrylic acid with 1,2-ethanediol, 1,2- and/or 1,3-propanediol and 1,4-butanediol being particularly preferred here as monomers Ab.

Very generally, the proportions by weight of the monomers Aa and Ab are preferably chosen with the aid of the Fox relationship so that a polymer A composed of these monomers has a glass transition temperature Tg of from −45° to 100° C., preferably from −15° to 80° C., very particularly preferably from 10° to 70° C.

According to Fox (T. G. Fox, Bull. Am. Phys. Soc. (Ser. II) 1 (1956), 123), the following is a good approximation for the glass transition temperature Tg, in degrees Kelvin, of copolymers:

$$\frac{1}{Tg} = \frac{X^1}{Tg^1} + \frac{X^2}{Tg^2} + \cdots \frac{X^n}{Tg^n},$$

where $X^1, X^2, \ldots, X^n$ are the mass fractions 1, 2, ..., n and $Tg^1, Tg^2, \ldots, Tg^n$ have the glass transition temperatures of the polymers composed in each case of only one of the monomers 1, 2, ..., n. The glass transition temperatures of these homopolymers of the abovementioned monomers Aa and Ab are known and are stated, for example, in J. Brandrup, E. H. Immergut, Polymer Handbook, 1st Ed., J. Wiley, New York, 1966 and 2nd Ed., J. Wiley, New York, 1975.

Advantageously polymerized monomers Ba are vinyl acetate, vinyl propionate, vinyl n-butyrate and vinyl laurate, among which vinyl propionate is very particularly preferred. Suitable monomers Bb are, in particular, vinyl esters of Versatic acids, among which VEOVA 9 and 10 are preferred.

Advantageously polymerized monomers Bc are esters of acrylic and methacrylic acid, among which the esters of acrylic acid are preferred. Particularly preferred monomers Bc are ethyl acrylate, n-butyl and tert-butyl acrylate, n-hexyl acrylate, 2-ethylhexyl acrylate, lauryl acrylate and stearyl acrylate.

Particularly suitable monomers Bd are monomers which, when polymerized alone, give homopolymers having high water solubility. Examples of these are acrylic and methacrylic acid and amides thereof, vinylsulfonic acid and the water-soluble salts of these acids.

The proportions by weight of the monomers Ba to Bd, based on the total amount of the monomers B to be polymerized, are preferably chosen with the aid of the Fox relationship so that a polymer B composed of these monomers has a glass transition temperature of from −30° to +50° C.

The glass transition temperatures of the homopolymers of the abovementioned monomers Ba to Bd are known in the same way as those of the monomers A.

Preferred novel aqueous polymer dispersions are those which contain either exclusively polymers A or exclusively polymers B.

The number average molecular weight of the dispersants a is preferably from 250 to 20,000, particularly preferably from 1,000 to 10,000. They are advantageously polyethers which contain, as polymerized units, ethylene oxide (EO) and propylene oxide (PO) in a molar ratio EO:PO of from 0.05 to 20, preferably from 0.1 to 10. Very particularly preferred dispersants a are those which are block copolymers of EO and PO, among which in turn those which contain a polypropylene glycol block flanked by two polyethylene glycol blocks are particularly advantageous, the two polyethylene glycol blocks preferably having the same average length. Corresponding polyethers are commercially available.

The alkyl group of the ethoxylated alkylphenols suitable as dispersants b are advantageously of 2 to 15, preferably 5 to 10 carbon atoms. The ethoxylated alkylphenols having branched alkyl groups are particularly preferred, the ethoxylated isoalkylphenols being particularly advantageous and among these in turn ethoxylated isooctylphenol being preferred. Particularly suitable degrees of ethoxylation are from 10 to 50, preferably from 20 to 30.

The alkyl radical of the ethoxylated fatty alcohols which are suitable as dispersants b is advantageously of 8 to 26, particularly advantageously 12 to 18, carbon atoms. The degree of ethoxylation of these ethoxylated fatty alcohols is preferably from 2 to 80, particularly advantageously from 15 to 30. The dispersants b are likewise known per se and are commercially available.

Suitable ethoxylated polysaccharides are ethoxylated starch, glycogen and cellulose. A particularly suitable dispersant c is ethoxylated cellulose which preferably has an average degree of ethoxylation of from 1.5 to 3.5 (the term average degree of substitution of from 1.5 to 3.5 is also used), based on the three hydroxyl groups of each anhydroglucose unit of the starting cellulose, and whose number average molecular weight is advantageously from $5 \cdot 10^3$ to $1 \cdot 10^5$. Such celluloses are likewise commercially available. Examples of these are the Natrosol ® types from Hercules.

The dispersants d are preferably the sulfuric half-esters (and the water-soluble salts thereof) of the dispersants b.

Preferably, no dispersant d is present.

Furthermore, the novel aqueous polymer dispersions preferably contain no further dispersants apart from the dispersants a) to d).

The novel aqueous polymer dispersions are advantageously prepared by free radical aqueous emulsion polymerization in the presence of a dispersant and a free radical polymerization initiator, preferably with the proviso that the dispersant is composed exclusively of, based on the monomer mixture to be polymerized, a) from 0.5 to 3% by weight of at least one polyether (dispersant a) composed of ethylene oxide and propylene oxide,
b) from 0.5 to 4% by weight of at least one ethoxylated alkylphenol and/or ethoxylated fatty alcohol (dispersant b),
c) from 0.5 to 3% by weight of at least one ethoxylated polysaccharide (dispersant c) and
d) from 0 to 4% by weight of one or more compounds selected from the group consisting of sulfuric half-esters of ethoxylated alkylphenols and ethoxylated fatty alcohols and the water-soluble salts thereof (dispersant d).

The total amount of dispersants a to d used is preferably $\leq 7$, particularly advantageously from 2 to 7, very particularly preferably from 4 to 6, % by weight, based on the total amount of the monomers to be polymerized.

The free radical aqueous emulsion polymerization can be carried out in a conventional manner. The polymerization temperature is usually from 0° to 100° C., preferably from 20° to 90° C.

Suitable water-soluble polymerization initiators are in particular peroxydisulfates, such as sodium peroxydisulfate, or combined systems which contain a reducing agent and a peroxide, e.g. formaldehyde sodium sulfoxylate/hydrogen peroxide or formaldehyde sodium sulfoxylate/tert-butyl hydroperoxide. As a rule, from 0.2 to 5% by weight, based on the total amount of the monomers to be polymerized, of polymerization initiators are used. It is also advantageous to carry out the polymerization in the presence of a molecular weight regulator, such as butenol or SH-containing compounds, such as mercaptoethanol, 2-ethylhexyl thioglycolate, thioglycollic acid or tert-dodecyl mercaptan, the use of the last-mentioned substance being very particularly advantageous. The amounts of such molecular weight regulators used are as a rule from 0.01 to 1% by weight, based on the monomers to be polymerized. The number average molecular weight of the resulting emulsion polymers is usually from $5 \cdot 10^3$ to $2 \cdot 10^5$. The free radical aqueous emulsion polymerization is preferably carried out in an acidic polymerization medium, and the pH can be controlled using buffer systems, such as sodium acetate. The polymerization can be carried out as a batch process or in the form of a feed process. The feed process is preferred; in this process, some of the polymerization batch is initially taken and heated to the polymerization temperature and the remainder is then added semi-continuously or continuously in separate feeds, one of which contains the monomers in pure or emulsified form. Feeding in the monomers as an aqueous emulsion is preferred, in an advantageous procedure the dispersants a and b being used to emulsify the monomers. If molecular weight regulators are used, they are preferably likewise added as part of the aqueous monomer emulsion. After the end of the actual polymerization, polymerization is frequently continued with the addition of further polymerization initiator in order to reduce the amount of residual monomers.

The prepared dispersion, whose solid content is preferably from 40 to 70% by weight, is then preferably brought to a pH of from 8 to 9, an aqueous calcium hydroxide suspension advantageously being used for pH regulation. Remarkably, however, the prepared dispersion can also be added directly in acidic form to the mineral binders used as building materials and containing in particular cement, without substantial coagulum formation.

The novel polymer dispersions can be spray-dried in a conventional manner (cf. for example DE-A-39 23 229, EP-A-78 449, DE-A-22 38 903, EP-A-56 622 and DE-A-33 44 242) and can advantageously be used, both in aqueous form and in the form of the redispersible spray-dried polymer powder, as an additive for mineral binders used as building materials. This term covers all formulations which contain, as essential components, mineral binders, such as cement, lime or gypsum as well as sands, gravels or crushed minerals serving as additives, and which, after mixing with water, solidify and harden (set) in the air and in some cases also under water.

Surprisingly, in spite of the high Tg of some of the emulsion polymers, solidified building materials which have in particular high flexural strength under tension are obtained as a result of the addition of the novel emulsion polymers. Further noteworthy properties of mineral binders modified with the novel aqueous polymer dispersions and used as building materials are the good processibility of the still unsolidified mortars, in particular their high adhesion, making the said mineral binders modified in this manner particularly suitable as repair materials. The fact that the mortar soldification is not substantially delayed by the addition of the dispersion and has advantageous shrinkage behavior is particularly beneficial. Regarding the last-mentioned properties, the dispersant to be used according to the invention has a particularly advantageous action.

The novel emulsion polymers are very suitable as additives for binders used as building materials and based on cement, the compatibility being substantially independent of the type of cement. For example, blast furnace cement, bituminous cement, water-repellant Portland cement, fast-setting cement, expanding cement and high-alumina cement, particularly preferably Portland cement, can be used, depending on the requirements.

For the preparation of a possible commercial form of the modified mineral binders used as building materials, the mineral binder (e.g. cement), the sands, gravels or crushed minerals serving as additives and the spray-dried emulsion polymer powder are advantageously mixed with one another. The weight ratio of polymer powder to mineral binder is preferably chosen to be from 0.05 to 0.20. By stirring the commercial form with water, the form for use (mortar or concrete) is obtained. The amount of water is advantageously such that a water/cement weight ratio of from 0.42 to 0.55 results. The form for use can of course be directly obtained if the emulsion polymer is added as an aqueous dispersion. Typical dry forms suitable for repair mortars contain from 50 to 70 parts by weight of sand (arithmetic mean of the maximum particle diameters in the range from 0.06 to 3 mm), from 20 to 30 parts by weight of cement,
from 0 to 2 parts by weight of a thixotropic agent (e.g. Elkem microsilica),
from 0 to 0.3 part by weight of fibers,
from 0.1 to 1.0 part by weight of an antifoam and
from 0 to 1 part by weight of a concrete plasticizer,
and the emulsion polymer in a weight ratio of polymer to cement of from 0.05 to 0.20. The purpose of adding the thixotropic agent is to increase the flowability of the aqueous mortar before it solidifies on standing.

EXAMPLES

EXAMPLE 1

Preparation of novel aqueous polymer dispersions D1 to D3

A mixture of
150 g of water,
7.5 g of a 20% strength by weight aqueous solution of ethoxylated tallow fatty alcohol (degree of ethoxylation: 22) and
38.7 g of feed 1 was heated to 90° C., and 10.3 g of feed 2 were added all at once. 15 minutes thereafter, the remaining amounts of feed 1 and of feed 2 were added continuously (the former in the course of 120 minutes and the latter in the course of 150 min), beginning at the same time and while maintaining a temperature of 90° C. The reaction mixture was then stirred for a further 120 minutes at 90° C. after which, for further polymerization, a solution of 1.0 g of tert-butyl hydroperoxide in 5.4 g of water and a solution of 0.5 g of sodium formaldehyde sulfoxylate in 5 g of water were added all at once and the reaction mixture was left to stand for 15 minutes while stirring. Thereafter, it was cooled to room temperature and brought to a pH of about 8.5 with 3.5 ml of a 20% strength by weight aqueous calcium hydroxide suspension.

Feed 1
137 g of water,
500 g of monomer mixture,
5 g of an ethylene oxide/propylene oxide block copolymer having a molar EO/PO ratio of 0.7 and a number average molecular weight of 3,200,
100 g of a 5% strength by weight aqueous solution of an ethoxylated cellulose (Natrosol 250 LR),
300 g of a 20% strength by weight aqueous solution of ethoxylated tallow fatty alcohol (degree of ethoxylation: 22) and
1.0 g of tert-dodecyl mercaptan Feed 2
100 g of water,
2.5 g of sodium peroxydisulfate Monomer compositions:
D1: 38% by weight of n-butyl acrylate and 62% by weight of styrene
D2: 47% by weight of n-butyl acrylate, 50% by weight of styrene and 3% by weight of hydroxypropyl acrylate
D3: 50% by weight of n-butyl acrylate and 50% by weight of styrene

EXAMPLE 2

Preparation of novel aqueous polymer dispersions D4 to D6

A mixture of
500 g of water,
2.5 g of sodium acetate,
2.5 g of butenol and
10 g of an ethoxylated cellulose (Natrosol 250 GR) was heated to 80° C., and 150 g of the feed were added all at once and then 10 g of an aqueous solution of 5 g of sodium peroxydisulfate in 100 g of water were introduced all at once. Thereafter, the remaining amount of the feed and the remaining amount of peroxide solution were added continuously (the former in the course of 3 hours and the latter in the course of 3.5 hours) beginning at the same time and while maintaining a temperature of 80° C. The reaction mixture was then stirred for a further 1 hour at 80° C.

Feed:
3 g of water,
1,000 g of monomer mixture,
10 g of an ethylene oxide/propylene oxide block copolymer having a molar EO/PO ratio of 0.7 and a number average molecular weight of 3,200 and
150 g of a 20% strength by weight aqueous solution of ethoxylated p-isooctylphenol (degree of ethoxylation: 25).

Monomer compositions:
D4: 60% by weight of vinyl propionate and 40% by weight of VEOVA 9
D5: 60% by weight of vinyl propionate, 30% by weight of VEOVA 9 and 10% by weight of tert-butyl acrylate
D6: 60% by weight of vinyl propionate, 20% by weight of VEOVA 9 and 20% by weight of tert-butyl acrylate

EXAMPLE 3

Testing of performance characteristics of cement mortars modified with the dispersions D1 to D3 a) Determination of the early strengths of a mortar material according to DIN 1164, Part 7

Composition of the mortar material:
217 g of quartz sand according to DIN 1164, Part 7, of particle size range 0.08–0.5 mm
434 g of quartz sand according to DIN 1164, Part 7 of particle size range 0.5–1.0 mm
217 g of Portland cement 35 F
86.5 g of water
1 g of a commercial antifoam and
44 g of one of the dispersions D1 to D3 from Example 1.

Mortar prisms were produced according to DIN 1164, Part 7, as test specimens from the freshly prepared mortar materials and were stored as in DIN 1164, Part 7, and the flexural strength under tension and the compressive strength of said mortar prisms were tested after 24 hours according to DIN 1164, Part 7. The results are shown in Table 1, the values being expressed as relative values, i.e. as values standardized to the result for a mortar material without added dispersions (for the preparation of which 108.5 g of water were used instead of 86.5 g of water).

TABLE 1

|   | Flexural strength under tension | Compressive strength |
| --- | --- | --- |
| D1 | 0.83 | 0.87 |
| D2 | 0.89 | 0.73 |
| D3 | 1 | 0.79 |
| without D | 1 | 1 |

The results show that solidification of the mortar is not substantially delayed by the addition of the dispersion.

b) Determination of the flexural strengths under tension of a mortar material according to DIN 1164, Part 7

The procedure was as in a), except that the test specimens were stored for 28 days. The results are shown in Table 2.

TABLE 2

|   | Flexural strength under tension (N/mm$^2$) |
| --- | --- |
| D1 | 8.8 |
| D2 | 9.2 |
| D3 | 8.6 |
| without D | 7.0 |

Table 2 shows that the flexural strengths under tension are increased when a dispersion is added.

EXAMPLE 4

Testing the performance characteristics of cement mortars modified with the dispersions D4 to D6 a) Determination of the early strengths of a mortar material according to DIN 1164, Part 7

Composition of the mortar material:
217 g of quartz sand according to DIN 1164, Part 7, of particle size range 0.08–0.5 mm,
434 g of quartz sand according to DIN 1164, Part 7, of particle size range 0.5–1.0 mm,
217 g of Portland cement 35 F,
75.6 g of water,
1 g of a commercial antifoam and
44 g of one of the dispersions D4 to D6 from Example 2.

Mortar prisms were produced according to DIN 1164, Part 7, as test specimens from the freshly prepared mortar materials and were stored as in DIN 1164, Part 7, and after 24 hours the flexural strength under tension and the compressive strength of said mortar prisms were tested according to DIN 1164, Part 7. The results are shown in Table 3. For comparison, it also contains the result for a mortar material without added dispersion, for the preparation of which 108.5 g of water were used instead of 75.6 g of water.

TABLE 3

|   | Flexural strength under tension (N/mm$^2$) | Compressive strength (N/mm$^2$) |
| --- | --- | --- |
| D4 | 4.23 | 18.6 |
| D5 | 4.07 | 18.1 |
| D6 | 4.41 | 19.0 |
| without D | 4.29 | 24.4 |

The results show that solidification of the mortar is not substantially delayed by the addition of the dispersion.

b) Determination of the final strengths of a mortar material according to DIN 1164, Part 7

The procedure was as in a), except that the test specimens were stored for 28 days. The results are shown in Table 4.

TABLE 4

|   | Flexural strength under tension (N/mm$^2$) | Compressive strength (N/mm$^2$) |
| --- | --- | --- |
| D4 | 9.8 | 41.2 |
| D5 | 10.0 | 40.3 |
| D6 | 10.0 | 42.3 |
| without D | 7.2 | 38.3 |

Table 4 shows that the final strengths are increased where a dispersion is added.

f) Determination of the shrinkage behavior of a repair mortar according to DIN 52,450

Composition of the mortar material:

180 g of quartz sand of particle size range 0.063–0.4 mm,
140 g of quartz sand of particle size range 0.15–0.6 mm,
180 g of quartz sand of particle size range 0.5–1.25 mm,
93 g of quartz sand of particle size range 1.5–3.0 mm,
239 g of Portland cement 35 F,
18 g of microsilica (Elkem Chemicals, Allensbach, Germany),
3 g of Dralon fibers (dtex 6.7/4 mm)
1 g of an antifoam,
98 g of water and
48 g of one of the dispersions D4 to D6 from Example 2.

The shrinkage values were determined according to DIN 52,450 (storage in room air: standard climatic conditions 23/50-2 according to DIN 50,014) and are shown in Table 5. For the Comparative Experiment without added dispersion, 122 g of water were used here instead of 98 g of water.

TABLE 5

|  | Shrinkage [mm/m] after 28 days |
|---|---|
| D4 | −0.8 |
| D5 | −0.7 |
| D6 | −0.8 |
| without D | −1.2 |

The Table shows that the shrinkage is reduced by the addition of the dispersion.

EXAMPLE 5

Comparison with most closely related prior art
  a) Reworking of Example 2 of Japanese Preliminary Published Application 9257/81 for the preparation of a Comparative Dispersion DV
A mixture of
1,243.5 g of water,
400.0 g of a 25% strength by weight aqueous solution of polyvinyl acetate, 88 mol % of whose ester groups are hydrolyzed (Mowiol ® 04-88) and
40.0 g of a 25% strength by weight aqueous solution of an ethylene oxide/propylene oxide block copolymer having a molar EO/PO ratio of 0.7 and a number average molecular weight of 3,200 was heated to 80° C., 100 g of feed were added all at once and then 10 g of an aqueous solution of 5 g of ammonium peroxydisulfate in 100 g of water were introduced. The remaining amount of the feed and the remaining amount of peroxide solution were added continuously (the former in the course of 3 hours and the latter in the course of 3.5 hours) beginning at the same time and while maintaining the temperature of 80° C. The reaction mixture was then stirred for a further hour at 80° C.
Feed:
600 g of vinyl acetate and
400 g of VEOVA 10
  b) Preparation of a novel aqueous polymer dispersion D7 to be compared with DV
A mixture of
1,331.5 g of water,
10.0 g of an ethoxylated cellulose (Natrosol 250 GR),
40.0 g of a 25% strength by weight aqueous solution of an ethylene oxide/propylene oxide block copolymer having a molar EO/PO ratio of 0.7 and a number average molecular weight of 3,200 and
150.0 g of a 20% strength by weight aqueous solution of an ethoxylated p-isooctylphenol (degree of ethoxylation 25) was heated to 80° C., 100 g of the feed were added all at once and then 10 g of an aqueous solution of 5 g of ammonium peroxydisulfate in 100 g of water were introduced. Thereafter, the remaining amount of the feed and the remaining amount of the peroxide solution were added continuously (the former in the course of 3 hours and the latter in the course of 3.5 hours) beginning at the same time and while maintaining the temperature of 80° C. The reaction mixture was stirred for a further hour at 80° C.
Feed:
600 g of vinyl acetate and
400 g of VEOVA 10
  c) Determination of the early strengths of mortar materials according to DIN 1164, Part 7, prepared with the addition of DV or D7

The mortar materials were prepared according to the formulations in Example 4a), except that the added amount of water was changed so that the prepared mortar had essentially the same water/cement weight ratio (W/C) as in Example 4a). The early strength of said mortar materials were then tested in the same manner as in Example 4a). The results are shown in Table 6.

TABLE 6

|  | W/C | Flexural strength under tension (N/mm$^2$) | Compressive strength (N/mm$^2$) |
|---|---|---|---|
| DV | 0.48 | 2.22 | 7.3 |
| D7 | 0.45 | 3.36 | 13.0 |

The results show that solidification of the mortar is delayed to a greater extent when an aqueous polymer dispersion according to the most closely related prior art is used than when the corresponding novel aqueous polymer dispersion is employed.

We claim:
1. An aqueous polymer dispersion which contains one or more polymers obtained by free radical polymerization and, based on the one or more polymers,
  a) from 0.5 to 3% by weight of at least one polyether (dispersant a) composed of ethylene oxide and propylene oxide,
  b) from 0.5 to 4% by weight of at least one ethoxylated alkylphenol or ethoxylated fatty alcohol (dispersant b),
  c) from 0.5 to 3% by weight of at least one ethoxylated polysaccharide (dispersant c) and
  d) from 0 to 4% by weight of one or more compounds selected from the group consisting of sulfuric half-esters of ethoxylated alkylphenols and ethoxylated fatty alcohols and water-soluble salts thereof (dispersant d).

2. An aqueous polymer dispersion as claimed in claim 1, whose polymer is composed of
  a) from 70 to 100% by weight of at least one monomer selected from the group consisting of styrene, α-methylstyrene, vinyltoluenes and esters of α,β-monoethylenically unsaturated carboxylic acids of 3 to 6 carbon atoms and alkanols of 1 to 12 carbon atoms (monomers Aa) and
  b) from 0 to 30% by weight of other copolymerizable monomers (monomers Ab).

3. An aqueous polymer dispersion as claimed in claim 1, whose polymer is composed of a) from 50 to 80% by weight of at least one ester of vinyl alcohol and straight-chain alkanecarboxylic acids of 1 to 18 carbon atoms (monomers Ba),
b) from 5 to 40% by weight of at least one ester of vinyl alcohol and branched alkanecarboxylic acids of 1 to 20 carbon atoms (monomers Bb),
c) from 0 to 45% by weight of one or more esters of α,β-monoethylenically unsaturated carboxylic acids of 3 to 6 carbon atoms and alkanols of 1 to 18 carbon atoms (monomers Bc) and
d) from 0 to 5% by weight of other copolymerizable monomers (monomers Bd).

4. An aqueous polymer dispersion as claimed in claim 1, whose dispersant a has a number average molecular weight of from 250 to 20,000 and contains ethylene oxide (EO) and propylene oxide (PO) as polymerized units in a molar ratio EO:PO of from 0.05 to 20.

5. An aqueous polymer dispersion as claimed in claim 1, whose dispersant b is an ethoxylated isooctylphenol having a degree of ethoxylation of from 10 to 50 or an ethoxylated fatty alcohol having a degree of ethoxylation of from 8 to 26.

6. An aqueous polymer dispersion as claimed in claim 1, whose dispersant c is ethoxylated cellulose.

7. An aqueous polymer dispersion as claimed in claim 1, whose dispersant comprises no more than dispersants a to d, in a total amount of from 2 to 7% by weight, based on the polymer.

8. A process for the preparation of an aqueous polymer dispersion as claimed in claim 1, wherein a mixture of monomers which are capable of free radical polymerization is polymerized by a free radical aqueous emulsion polymerization in the presence of a dispersant and a free radical polymerization initiator, with the proviso that the dispersant is composed of, based on the monomer mixture to be polymerized,
a) from 0.5 to 3% by weight of at least one polyether (dispersant a) composed of ethylene oxide and propylene oxide,
b) from 0.5 to 4% by weight of at least one ethoxylated alkylphenol or ethoxylated fatty alcohol (dispersant b),
c) from 0.5 to 3% by weight of at least one ethoxylated polysaccharide (dispersant c) and
d) from 0 to 4% by weight of one or more compounds selected from the group consisting of sulfuric half-esters of ethoxylated alkylphenols and ethoxylated fatty alcohols and the water-soluble salts thereof (dispersant d).

9. A building material, comprising an aqueous polymer dispersion as claimed in claim 1, in aqueous or spray-dried form, and a mineral binder.

10. A mineral binder used as a building material, containing a polymer powder prepared by spray drying an aqueous polymer dispersion as claimed in claim 1.

11. A hydraulic cement comprising an effective amount of a crushed mineral, a Portland cement, water and an effective amount of an aqueous polymer dispersion as claimed in claim 1, wherein said polymer dispersion and hydraulic cement are present in a weight ratio of 0.05 to 0.2 and said water and said hydraulic cement are present in a weight ratio based on polymer content of from 0.42 to 0.55.

* * * * *